U̇nited States Patent Office 2,744,927
Patented May 8, 1956

2,744,927
SOLVENT EXTRACTION OF BLACK LIQUOR

James E. Copenhaver, William A. Biggs, Jr., and William H. Baxley, Hartsville, S. C., assignors to Sonoco Products Company, a corporation of South Carolina No Drawing. Application November 28, 1952,
Serial No. 323,144

2 Claims. (Cl. 260—527)

This invention relates to the treatment of pulp and paper mill effluent to remove therefrom the constituents harmful to fish or other animal life in streams receiving the effluent, and to recover in reusable form certain components of the waste effluent, which is commonly referred to as "black liquor."

The process of this invention relates more particularly to solvent extraction of black liquor resulting from the semi-chemical or neutral sulfite process for paper pulp production. This type of process is becoming increasingly attractive and important because of the high yields obtainable thereby and also the sheet-forming qualities of the pulp so produced. Paper mills are progressively adopting this semi-chemical process, and this fact has increased the problem of pollution in the streams into which the black liquor is discharged, as well as the economic necessity for recovering certain valuable constituents in the black liquor in a form suitable for commercial use.

The black liquor resulting from the semi-chemical neutral sulfite process partciularly aggravates the stream pollution problem because of the fact that the B. O. D. (biological oxygen demand) of the liquor solids from that type of process is approximately 400,000 parts per million. As a consequence, if large quantities of black liquor produced in the semi-chemical process are discharged into streams containing fish and other marine life, it will cause deleterious results. Also, as above suggested, it is commercially important to recover from this black liquor, certain constitutents, especially the organic acids and pentose and hexose sugars. A typical analysis of the neutral sulfite black liquor shows the following percentages of these and other solids present therein:

| | Percent |
|---|---|
| Sodium lignin sulfonate | 57.5 |
| Sodium acetate | 28.0 |
| Sodium formate | 3.0 |
| Calcium oxalate | 0.5 |
| Pentose sugars | 9.6 |
| Hexose sugars | 1.4 |
| | 100.0 |

The lignin content of the black liquor, indicated by the above sodium lignin sulfonate, has virtually no oxygen demand and therefore itself does not create a B. O. D. problem. Nevertheless, its decomposition yields mercaptans that produce very objectionable odors, and numerous efforts have been made and substantial sums of money expended in times past to alleviate this condition, without complete success.

In accordance with the present invention, we have discovered that the B. O. D. problem can be satisfactorily met, and valuable recovery of the organic acids and sugars in the black liquor obtained, by acidifying the black liquor, and extracting the acidified black liquor with an ester-alcohol solvent mixture. Illustrative but non-limiting examples of these mixtures are the following:

90% ethyl acetate
10% ethanol

70% isopropyl acetate
30% isopropanol

75% normal propyl acetate
25% normal propyl alcohol

We have utilized the above mixtures, as well as other similar ones, for solvent extraction of the acidified black liquor containing from about 10% to 60% solids, and usually about 25% to 40% solids, with very satisfactory results. As a result of this solvent extraction treatment of the black liquor, its B. O. D. value is reduced about 50%, and recoveries of about 95% or more of the acetic and formic acid contents of the black liquor are obtained. Also, recoveries of about 10% to 20% or higher of the pentose and hexose sugars are obtained. The higher the ratio of alcohol the higher the percentage removal of sugars.

It is important to note that the solvents usually accepted in the art for most efficient recovery of acetic acid from dilute solutions are the aliphatic esters, such as ethyl, propyl, butyl, and amyl acetate. However, we found that in attempting to employ the known solvent extraction properties of these esters in the usual manner, that is, in the absence of alcohol, for treatment of black liquor, they were entirely ineffective and unsatisfactory. When these solvents were used in essentially pure state, that is, 5% or less by volume of alcohol content, for extracting black liquor, they would completely emulsify upon agitation with the acid liquor, and accordingly extraction of the emulsified mixture could not be effected by the usual gravity procedures, or, if so, only after impractically long periods of settling. We found the same to be true of the higher molecular weight ketones, above methyl ethyl ketone, ethers, benzol, toluene, carbon tetrachloride and alcohols not infinitely soluble in water. All such materials produced an emulsion which was not practical to handle for extraction of the acids and sugar contents of the black liquor. These emulsions can be broken only by prolonged centrifuging which is impractical in a continuous extraction process and results in hard precipitation of suspended solids which rapidly foul the system.

We have been able to overcome all of these problems, in accordance with our above-mentioned discovery, by the combining of solvents having infinite water solubility, such as acetone, methyl, ethyl, propyl, isopropyl and tertiary butyl alcohols, with esters having limited solubility, such as, for example, the above-mentioned ethyl and isopropyl acetates. This combination of alcohols and esters permits phase separation and prevents the formation of emulsions, in direct proportion to the amount of alcohol used. This combination of esters and alcohols covers the lower aliphatic compounds and extends up to and includes the propyl isomers and tertiary butyl alcohol. When such alcohols are combined with the lower aliphatic esters, the resulting solution proves highly effective as an extracting solvent for the solid constituents of black liquor from the semi-chemical process. This combination solvent avoids the formation of an emulsion and gives good phase separation and high extraction efficiency, especially when extracting black liquor containing a relatively high solids concentration, for example, up to about 60% solids. We have found that the more concentrated the black liquor, the less likely it is to emulsify, but at the same time when an emulsion is formed, it is more difficult to break the emulsion than with lower solids concentrations. Similarly, we have found that the higher the molecular weight of the ester and the alcohol, more alcohol is required in proportion to the ester to effect the separation, and the easier it is to emulsify.

Also, we have noted that the higher the ratio of alcohol to ester, the greater the extraction efficiency per stage for acetic and formic acid and B. O. D. reduction. Test data showing these relative values and indicating the characteristic features of the process are given below. These data also illustrate the effect of alcohol, liquor solids, and molecular weight on the emulsion behavior, solids precipitation tendency, centrifuging, and extraction efficiency.

Table 1.—The extraction efficiency and emulsification tendency of various solvents with acidified black liquor—One contact at 1/1 ratio by volume at 25° C. (77° F.)

[25 mls. solvent to 25 mls. liquor]

| Experiment Number | Solvent | Phase Separation | | | | Extract, Percent | Solid Precipitate Centrifuged | Solubility | |
|---|---|---|---|---|---|---|---|---|---|
| | | Gravity Volumes | | Centrifuged Volumes | | | | Water In Percent | In Water Percent |
| | | Raff. | Extract | Raff. | Extract | | | | |
| | | | | mls. | mls. | | mls. | | |
| WB-5273 | Ethyl Ether | Emulsion | Emulsion | 26 | 24 | 31.3 | 0.3 | 1.3 | 6 |
| WB-5274 | CCl4 | do | do | 25 | 25 | nil | nil | .03 | 0.1 |
| WB-5275 | Thiophene | do | do | 38 | 12 | 1.2 | nil | nil | 0 |
| WB-5276 | Benzol | do | do | 30 | 20 | 2.3 | nil | 0 | 0.2 |
| WB-5277 | 99% Ethyl Acetate [1] | do | do | 28 | 22 | 45.2 | 0.2 | 4 | 8 |
| WB-5278 | 85% Ethyl Acetate [1] | 27 mls | 23 mls | 27 | 23 | 53.6 | 0.6 | 11 | 9 |
| WB-5279 | 95% Ethanol | 15 | 35 | 3 | 47 | 100.0+ | 3.5 | ∞ | ∞ |
| WB-5280 | 90% n-Butyl Acetate [1] | Emulsion | Emulsion | 27 | 23 | 38.4 | 0.2 | 2 | .5 |
| WB-5281 | Mixed Isomer Amyl Acetate | do | do | 28 | 22 | 27.8 | 0.4 | 1.2 | .2 |
| WB-5282 | Tertiary Butyl Alcohol | 13 | 37 | 13 | 37 | 81.3 | 0.2 | ∞ | ∞ |
| WB-5283 | n-Butyl Alcohol | Emulsion | Emulsion | 22 | 28 | 60.5 | 0.2 | 20 | 8 |
| WB-5299 | 2-Butanone | 30 | 20 | 28 | 22 | 57.1 | 0.2 | 12 | 26 |

All the above was 10% solids liquor (0.562 grams acid (as acetic) 25 mls.). All those below were 40% solids liquor (2.25 grams Acid (as acetic) 25 mls)

| WB-5273 | | Emulsion | Emulsion | 30 | 20 | 38.1 | 1.0 | | |
| WB-5274 | | do | do | 26 | 24 | 5.1 | 3.0 | | |
| WB-5275 | | do | do | 26 | 24 | 9.5 | 1.1 | | |
| WB-5276 | | do | do | 25 | 25 | 8.5 | 1.0 | | |
| WB-5277 | | do | do | 25 | 25 | 58.7 | 0.9 | | |
| WB-5278 | | 32 | 18 | 23 | 27 | 73.4 | 1.3 | | |
| WB-5279 | | 25 | 25 | 7 | 43 | 96.0 | 7.4 | | |
| WB-5580 | | Emulsion | Emulsion | 28 | 22 | 43.0 | 0.6 | | |
| WB-5281 | | do | do | 26 | 24 | 40.9 | 0.7 | | |
| WB-5282 | | 25 | 25 | 20 | 30 | 75.0 | 1.0 | | |
| WB-5283 | | Emulsion | Emulsion | 22 | 28 | 63.2 | 1.0 | | |
| WB-5299 | 2-Butanone | 23 | 28 | 22.5 | 27.5 | 64.3 | 0.5 | | |

[1] Remainder is corresponding alcohol.

Table 2.—Effect of alcohols on the emulsification tendency and extraction efficiency of esters with acidified black liquor at 25° C. (77° F.)

[25 mls. liquor/25 mls. solvent, 1 stage]

ETHYL ACETATE-ETHANOL

| Liquor Solids | 10% | | | | | 25% | | | | | 40% (shaken)[3] | | | | | 40% (osterized)[2] | | | |
|---|---|---|---|---|---|---|---|---|---|---|---|---|---|---|---|---|---|---|---|
| Experiment Number | WB-5255— | | | | | WB-5254— | | | | | WB-5256— | | | | | WB-5257— | | | |
| | 1 | 2 | 3 | 4 | 5 | 1 | 2 | 3 | 4 | 5 | 1 | 2 | 3 | 4 | 5 | 1 | 2 | 3 | 4 |
| Percent Alcohol in Ester | 1 | 10 | 20 | 30 | 50 | 1 | 10 | 20 | 30 | 50 | 1 | 10 | 20 | 30 | 50 | 1 | 10 | 20 | 30 |
| Extract Volume (mls.): | | | | | | | | | | | | | | | | | | | |
| After osterizing | | | | | | | | | | | | | | | | 0 | 21 | 23 | 26 |
| After shaking [1]— | | | | | | | | | | | | | | | | | | | |
| 2 min. and standing 10 min | 0 | 22 | 22 | 21 | | 22 | 23 | 24 | 25 | | 27 | 27 | 27 | 27 | 28 | | | | |
| 4 min and standing 10 min | 0 | 19 | 21 | 20 | | 19 | 22 | 23 | 24 | | 26 | 27 | 26 | 27 | 28 | | | | |
| 6 min. and standing 10 min | 0 | 17 | 20 | 1 | | 0 | 21 | 22.5 | 24 | | 25 | 27 | 26 | 26 | 28 | | | | |
| 8 min. and standing 10 min | 0 | 0 | 0 | 0 | | 0 | 20 | 22 | 23 | | 24 | 25 | 26 | 24 | 28 | | | | |
| 8 min. extract after centrifuging 10 min. (mls.) | 24 | 23 | 23 | 22 | | 25 | 25 | 25 | 25 | | 24 | 26.5 | 27 | 27.5 | 31.5 | 24 | 26 | 26 | 28.5 |
| Extraction efficiency as acetic acid, percent:[4] | | | | | | | | | | | | | | | | | | | |
| Not centrifuged | 0 | 0 | 0 | 0 | | 0 | 44.8 | 51.7 | 60 | | 58 | 64.5 | 74 | 72 | 82.2 | 0 | 54.2 | 62.9 | 74 |
| Centrifuged | 44.2 | 49.1 | 52.1 | 54.1 | | 50.2 | 56 | 58.7 | 65.1 | | 58 | 68.2 | 77 | 82.5 | 92.5 | 55.2 | 67 | 71 | 81 |
| Solid precipitate on centrifuging (mls.) | nil | nil | nil | nil | | | | | | | 0.5 | 0.6 | 0.8 | 2.0 | | | | | |
| Ultimate time to completely emulsify in osterizer (secs.)[2] | 12 | 12 | 12 | 12 | 12 | 10 | 16 | 26 | 392 | ∞ | 60 | 900 | ∞ | ∞ | ∞ | 60 | 900 | ∞ | ∞ |

Table 2.—*Effect of alcohols on the emulsification tendency and extraction efficiency of esters with acidified black liquor at 25° C. (77° F.)*—Continued.

ISOPROPYL ACETATE-ISOPROPANOL

| Liquor Solids | 10% | | | | | 25% | | | | | 40% | | | | |
|---|---|---|---|---|---|---|---|---|---|---|---|---|---|---|---|
| Experiment Number | WB-5259— | | | | | WB-5260— | | | | | WB-5258— | | | | |
| | 1 | 2 | 3 | 4 | 5 | 1 | 2 | 3 | 4 | 5 | 1 | 2 | 3 | 4 | 5 |
| Percent Alcohol in Ester | 5 | 10 | 20 | 30 | 50 | 5 | 10 | 20 | 30 | | 5 | 10 | 20 | 30 | 50 |
| Extract Volume (mls.): After shaking [1] | | | | | | | | | | | | | | | |
| 2 min. and standing 10 min | 22 | 23.5 | 23 | 24 | | 22.5 | 23 | 23 | 25 | | 0 | | 1 | | 28 |
| 4 min. and standing 10 min | 18 | 19.5 | 21 | 22 | | 0 | 20 | 20 | 24 | | 0 | | 0 | | 28 |
| 6 min. and standing 10 min | 0 | 0 | 2 | 21 | | 0 | 17 | 18 | 23 | | 0 | | 0 | | 28.5 |
| 8 min. and standing 10 min | 0 | 0 | | 22 | | 0 | 0 | 14.5 | 22.5 | | 0 | | 0 | | 29 |
| 8 min. extract after centrifuging 10 min. (mls.) | 21 | 23 | 23.5 | 24 | | 22 | 22 | 26 | 26 | | 4 | | 20 | | 29 |
| Extraction efficiency as acetic acid, percent: [4] | | | | | | | | | | | | | | | |
| Not centrifuged | 0 | 0 | | 49 | | 0 | 0 | 33.6 | 55 | | 0 | | 0 | | 81.9 |
| Centrifuged | 32.7 | 41.3 | 48.8 | 53.6 | | 40.6 | 44.1 | 55.4 | 63.7 | | 8.5 | | 50 | | 81.9 |
| Solid precipitate on centrifuging (mls.) | nil | nil | nil | nil | nil | 0.1 | 0.1 | 0.1 | 0.1 | | 1.0 | | 1.3 | | 2.0 |
| Ultimate time to completely emulsify in osterizer (secs.) [2] | 9 | 9 | 9 | 9 | 9 | 9 | 15 | 32 | ∞ | | 42 | | 125 | ∞ | ∞ | n-PROPYL ACETATE-n-PROPANOL

| Liquor Solids | 10% | | | | | 25% | | | | | 40% | | | | |
|---|---|---|---|---|---|---|---|---|---|---|---|---|---|---|---|
| Experiment Number | WB-5261— | | | | | WB-5262— | | | | | WB-5263— | | | | |
| | 1 | 2 | 3 | 4 | 5 | 1 | 2 | 3 | 4 | 5 | 1 | 2 | 3 | 4 | 5 |
| Percent Alcohol in Ester | 5 | 10 | 20 | 30 | 50 | 5 | 10 | 20 | 30 | 50 | 5 | 10 | 20 | 30 | 50 |
| Extract Volume (mls.): After shaking [1] | | | | | | | | | | | | | | | |
| 2 min. and standing 10 min | 0 | 22 | 23 | 24 | | 0 | 21.5 | 24 | 24 | | 0 | 0 | 0 | 0 | |
| 4 min. and standing 10 min | 0 | 19 | 23 | 23 | | 0 | 20 | 19 | 23 | | 0 | 0 | 0 | 0 | |
| 6 min. and standing 10 min | 0 | 18 | 22 | 23 | | 0 | 17 | 17 | 22 | | 0 | 0 | 0 | 0 | |
| 8 min. and standing 10 min | 0 | 15 | 18 | 22.5 | | 0 | 0 | 15 | 21 | | 0 | 0 | 0 | 0 | |
| 8 min. extract after centrifuging 10 min. (mls.) | 23 | 24 | 24.5 | 24 | | 24 | 23 | 25 | 25 | | 17.5 | 18 | 23 | 26 | |
| Extraction efficiency as acetic acid, percent: [4] | | | | | | | | | | | | | | | |
| Not centrifuged | 0 | 28.3 | 35.4 | 49.5 | | 0 | 0 | 34.1 | 52 | | 0 | 0 | 0 | 0 | |
| Centrifuged | 35 | 40.9 | 48 | 52.8 | | 43.1 | 47.7 | 56.6 | 61.5 | | 36.4 | 39.3 | 55.8 | 68.4 | |
| Solid precipitate on centrifuging (mls.) | nil | nil | nil | nil | | 0.1 | 0.1 | 0.1 | 0.1 | | 1.1 | 1.2 | 1.4 | 1.5 | |
| Ultimate time to completely emulsify in osterizer (secs.) [2] | 12 | | 15 | 18 | 36 | 15 | | 30 | 63 | ∞ | 36 | | 108 | ∞ | |

[1] Shaken in 50 ml. tubes.
[2] Intensive "Waring-type" blender.
[3] Viscosity too high for good mixing by shaking; can be compensated for by extraction at higher temperature.
[4] Of clear extract.

Where the extracted acids (acetic and formic) are to be essentially dehydrated on solvent recovery, there is a limit to the amount of alcohol which may be used proportionate to the amount of ester unless additional water entrainers are used. This varies with the alcohol-ester system used. Table 3, below, gives the composition of ester-water and alcohol-water binaries, as well as the ester-alcohol-water ternaries for each system. The presence of the acetic and formic acid will increase these solubilities somewhat.

Table 3.—*Boiling points of esters, alcohols, their binaries, and ternaries with water,* °C.

[E=ester, A=alcohol, W=water]

| | A, B. P. | E, B. P. | Binary E-W | | Binary E-A | | Ternary | | | |
|---|---|---|---|---|---|---|---|---|---|---|
| | | | B. P. | $H_2O$, Percent | B. P. | A, Percent | B. P. | E, Percent | A, Percent | W, Percent |
| Propyl formate | 97.2 | 81 | 71.6 | 2.3 | 80.6 | 9.8 | 70.8 | 82 | 5 | 13 |
| Butyl formate | 117.7 | 106.9 | 83.8 | 16.5 | 105.8 | 23.7 | 83.6 | 68.7 | 10 | 21.3 |
| Isobutyl formate | 107.9 | 98.5 | 80.4 | 7.8 | 97.8 | 20.6 | 80.2 | 76 | 6.7 | 17.3 |
| Isoamyl formate | 131.6 | 123.3 | 90.2 | 21 | 123.6 | 26 | 89.8 | 48 | 19.6 | 32.4 |
| Methyl acetate | 64.6 | 54.0 | | | 54 | 18.5 | | | | |
| Ethyl acetate | 78.3 | 77.1 | 70.45 | 8.6 | 71.8 | 30.6 | 70.3 | 83.2 | 9 | 7.8 |
| Isopropyl acetate | | | 77.4 | 6.2 | | | 76.2 | 63.7 | 26.2 | 10.1 |
| Propyl acetate | 97.2 | 101.6 | 82.4 | 14 | 94.2 | 40 | 82.2 | 59.5 | 19.5 | 21 |
| Butyl acetate | 117.7 | 125.1 | 90.2 | 28.7 | 117.2 | 47 | 89.4 | 35.3 | 27.4 | 37.3 |
| Isobutyl acetate | 107.9 | 116.3 | 87.4 | 16.6 | 87.4 | 16.6 | 86.8 | 40.5 | 23.1 | 30.4 |
| Amyl acetate | 137.8 | 148 | 95.2 | 41 | | | 94.8 | 10.5 | 33.3 | 56.2 |
| Isoamyl acetate | 131.6 | 139 | 93.8 | 36.2 | | | 93.6 | 24 | 31.2 | 44.8 |

The solvent extraction process may be carried out with a conventional tower utilizing counter-current flow principles for bringing the black liquor in contact with the ester-alcohol extracting solvent. However, we have obtained excellent results by using a more recent form of centrifugal, continuous, multi-stage, counter-current extractor manufactured by Podbielniak, Inc., Chicago, Illinois. This extractor is covered in a number of patents issued to W. J. Podbielniak, including Patent No. 2,003,308, issued June 4, 1935. By use of this type of apparatus, accurate and instantaneous control can be had of the phase contacting and separation by application of highly variable degrees of centrifugal force balanced to just effect complete separation and suspended solids removal in the raffinate without fouling the extractor. Furthermore, on shut-downs of the extractor, the liquid hold-up is only a few gallons against very large volumes in a counter-current gravity tower. Also, the use of this type apparatus reduces contact time between solvent and water phases to almost instantaneous contact and separation and thereby reduces solvent loss due to hydrolysis to a minimum. This is a very serious consideration when extracting with the lower esters in an acid system.

The following is an illustrative but non-limiting example of the process of this invention. Black liquor from the semi-chemical process is concentrated to 25% solids content, this neutral concentrated black liquor is acidified with 66° Baumé (95%) sulfuric acid, the acidified solution is passed through the heat exchanger to hydrolize the sugars, and the remaining solution is contacted counter-currently in the Podbielniak extractor with about 1½ volumes of the solvent combination of 90% ethyl acetate and 10% ethanol. The extract obtained is run through a solvent recovery column, and concentrated acetic and formic acids, containing a small percentage of solids dissolved from the liquor in the extraction operation, pass out of the bottom of the column. These concentrated acids containing dissolved solids are run through a rectifying column. The acetic and formic acids are taken as overhead and furfural containing dissolved solids is passed out of the bottom of the column and is subsequently distilled to remove water and is then drawn off and passed to storage.

The same process described above has been carried out under the same conditions by using in the different cases the following ester-alcohol solvent combinations:

70% isopropyl acetate
30% isopropanol

75% n-propyl acetate
25% n-propanol

75% n-propyl acetate
25% acetone

The above solvent ratios and other conditions in the process may be varied to obtain best results with various concentrations of the black liquor, temperature of extraction, centrifugal force applied, including gravitational force, intensity of phase mixing, and other operating conditions. Likewise, the volume ratios of black liquor to solvent are not limited to examples cited and will depend upon other variables including slope of the equilibrium line, stage efficiency, and the degree of extraction desired.

We claim:

1. A process of treating black liquor to effect the removal therefrom of acetic acid, comprising concentrating said black liquor to a solids content of approximately 25% to 60%, acidfying the concentrated black liquor with sulfuric acid, and extracting the concentrated and acidified black liquor with a solution composed of 70% isopropyl acetate and 30% isopropanol and separating the acetic acid from the extracting solvent.

2. A process of treating black liquor to effect the removal therefrom of acetic acid, comprising concentrating said black liquor to a solids content of approximately 25% to 40%, acidifying the concentrated black liquor with sulphuric acid, and extracting the concentrated and acidified black liquor with a solution composed of approximately 70% isopropyl acetate and approximately 30% isopropanol, and separating the acetic acid from the extracting solvent.

References Cited in the file of this patent

UNITED STATES PATENTS 2,129,684    Gordon et al. _____ Sept. 13, 1938

OTHER REFERENCES

Doering: Chem. Abstracts, vol. 38, column 4128 (1944).

McLaughlin: Chem. Abstracts, vol. 43, column 7682 (1949).

Braun et al.: Chem. Abstracts, vol. 44, column 4677 (1950).